Figure 1:
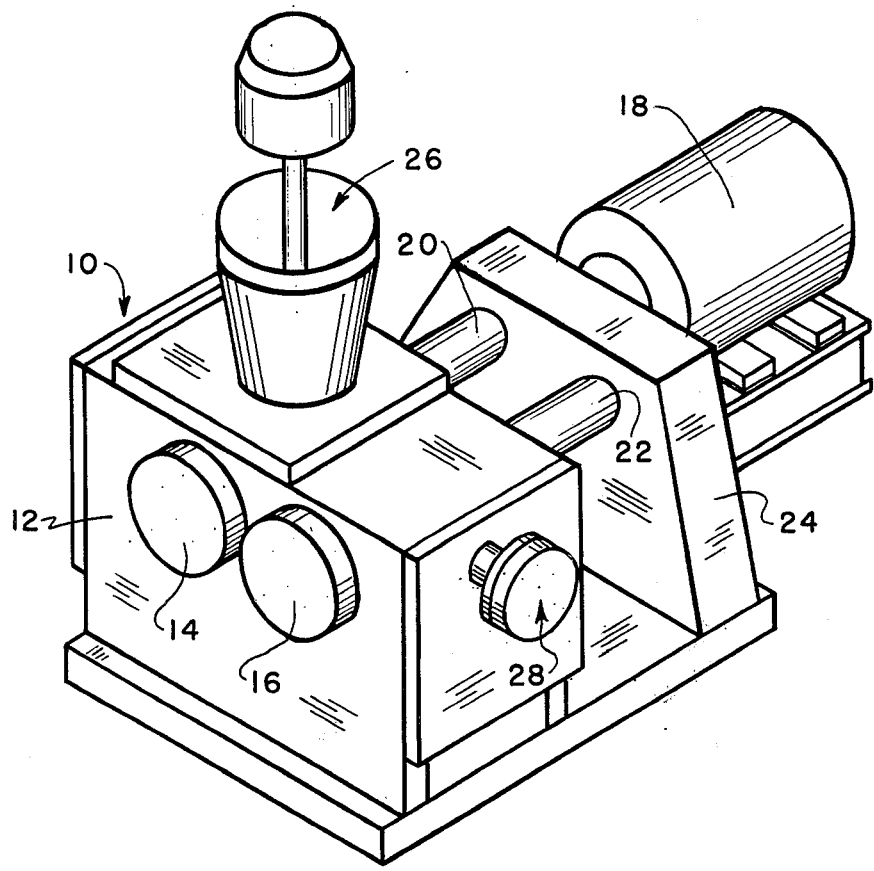

United States Patent [19]
Greenberger

[11] 3,901,635
[45] Aug. 26, 1975

[54] CONTROL SYSTEM FOR BRIQUETTERS
[75] Inventor: Joseph Irwin Greenberger, Pittsburgh, Pa.
[73] Assignee: Wean United, Inc., Pittsburgh, Pa.
[22] Filed: Feb. 8, 1974
[21] Appl. No.: 440,921

[52] U.S. Cl. ............... 425/145; 425/145; 425/150; 425/367
[51] Int. Cl.².... B29C 3/06; B29C 15/00; B30B 3/00
[58] Field of Search ............. 425/237, 29, 145, 149, 425/135, 150; 77/32.1, 367

[56] References Cited
UNITED STATES PATENTS

| | | | |
|---|---|---|---|
| 3,173,315 | 3/1965 | Fuldner et al. | 77/32.1 |
| 3,487,507 | 1/1970 | Turk | 425/29 |
| 3,509,600 | 5/1970 | Noble | 425/145 |
| 3,559,247 | 2/1971 | Larsson | 425/149 |
| 3,597,794 | 8/1971 | Mann | 425/145 X |
| 3,667,884 | 6/1972 | Reinfeld | 425/149 |
| 3,693,946 | 9/1972 | Merritt | 425/145 X |
| 3,721,512 | 3/1973 | Ma et al. | 425/149 |
| 3,734,659 | 5/1973 | Harris | 425/237 X |
| 3,781,151 | 12/1973 | Harris | 425/237 X |

OTHER PUBLICATIONS
Computor Article in *Modern Plastics*, 10/1968, pp. 122–126.

*Primary Examiner*—J. Howard Flint, Jr.
*Attorney, Agent, or Firm*—Daniel Patch; Henry C. Westin

[57] ABSTRACT

The present disclosure pertains to an apparatus and control system for machines employed for briquetting chemicals, minerals, mining and metallurgical materials. The system includes a piston cylinder assembly for positioning a first briquetting roll relative to a second roll, the position of the piston cylinder assembly being controlled by a position transducer arranged to measure relative movement between the rolls and to thereby provide a constant thickness of the formed product. It also includes a pressure transducer for measuring the operative pressure of the piston cylinder assembly and for changing the rate of feed of the feed screw to provide a constant pressure between the rolls and thereby a constant density product.

3 Claims, 2 Drawing Figures

CONTROL SYSTEM FOR BRIQUETTERS

Present-day briquetting machines and controls have employed a preloading system to attempt to control the uniformity of the thickness and uniformity of the density of the formed product. These systems typically employed load cells to allow the briquetting machine to be preloaded in an attempt to maintain the space or gap between the cooperative product forming rolls constant thereby attempting to produce a constant thickness product. As to attempting to obtain a uniform density, the present-day machines and related controls varied the speed of the power means for the screw feed in relationship to a change in the speed of the power means that drives the rolls.

Since no attempts were made to directly control the gap between the rolls as the resistance created by the material changed, present-day machines have proven unacceptable in producing constant thickness products. Moreover, the procedure and control employed to obtain constant density of the product also fell short of requirements because of, among other things, the sluggishness or slowness of response due to the inertia involved in the drives for the rolls and the feed screw.

It is therefore the object of the present invention to provide an improved briquetting machine and control for producing a product having a substantially uniform thickness and density.

More particularly, the present invention provides an improved machine and control including a means for positioning a first briquetting roll relative to a second briquetting roll, the position of the positioning means being controlled by a position measuring means arranged to measure the relative movement between the rolls and to thereby provide a constant thickness of the formed product, a second measuring means adapted to measure the energy of said roll positioning means and for changing the rate of feed of the feed screw to provide for a constant pressure between the rolls and thereby a constant density product.

A still further object of the present invention is to provide a piston cylinder assembly for positioning said one roll, a position transducer for measuring the relative movement between the rolls, and a pressure transducer for measuring the pressure of the piston cylinder assembly.

Figure 2:
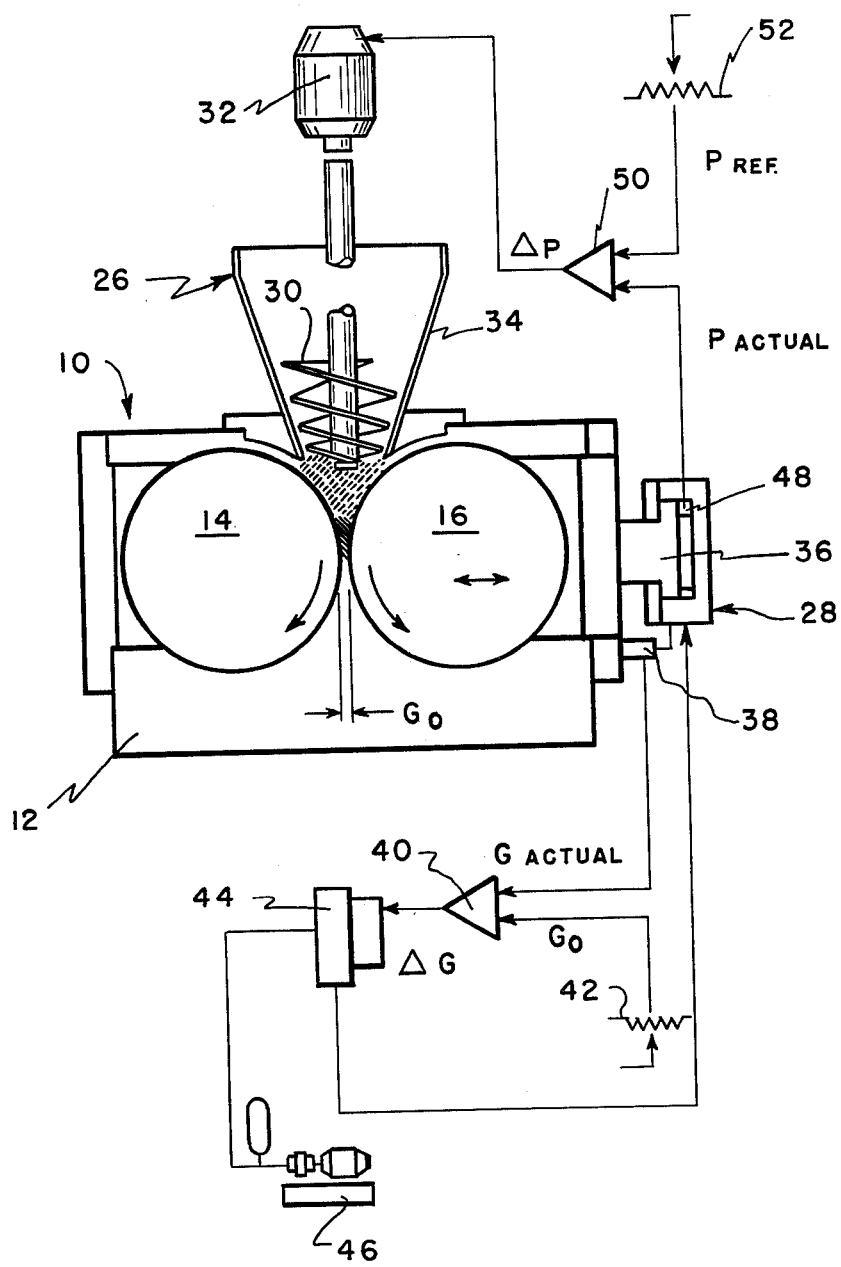

These objects, as well as other novel features and advantages of the present invention, will be better understood when the following description thereof is read along with the following drawings of which:

FIG. 1 is a prospective view of a briquetting machine including the features of the present invention; and FIG. 2 is a sectional elevation view taken on a vertical plane passing through the feed screw and roll positioning piston cylinder assembly of the machine shown in FIG. 1.

Referring first to FIG. 1, there is illustrated a vertically fed briquetting machine 10 comprising a frame 12 having openings for rotatably supporting a pair of cooperative horizontally arranged briquetting rolls 14 and 16. The rolls, in the usual manner, are rotated by a motor 18 as indicated by the arrows associated with the rolls in FIG. 2. Spindles 20 and 22 transmit the torque of the motor 18 to the rolls through gear unit 24. FIG. 1 also illustrates a portion of the feed screw 26 and the piston cylinder assembly 28 employed to adjust roll 16 relative to the roll 14 which elements will be more fully described later on.

The sectional view of FIG. 2 best illustrates the relationship of the rolls 14 and 16 to feed screw 30 and piston cylinder assembly 28. The construction of the feed screw, as with the machine generally, follow well-known practice, the drawing showing the varying, enveloping, decreasing diameter screw 30, the shaft of which is connected to an electrical motor 32. A shroud 34 arranged around the screw 30 conforms to the taper of the screw itself and directs the material as it is advanced by the screw to the V-section formed by the adjacent outer surfaces of the rolls 14 and 16. Consequently, the material is fed to the gap between the rolls where it is compressed to a thickness defined by the roll gap designated in FIG. 2 as Go.

FIG. 2 also shows more clearly the piston cylinder assembly 28 employed to control the position of the roll 16 relative to the roll 14 and thereby control the roll gap Go. While not shown in the drawing the rolls, according to well-known designs, are rotatably mounted in bearing chocks, in which the bearing chocks of the rolls 16 are horizontally slideable relative to the roll 14 in the frame 12. This movement is supplied by the piston rod 36 of the piston cylinder assembly 28 being arranged to contact the bearing chock of roll 16.

The control of the present invention is also best shown in FIG. 2. In referring first to that aspect of the control employed to maintain a constant roll gap even though the pressure created by the material between the rolls may vary, it will be first observed that associated with the piston cylinder assembly 28 is a position transducer 38. While the drawing only diagrammatically shows the position transducer 38, it is to be noted that it is arranged to measure the relative distance between the cylinder of the piston cylinder assembly 28 and the piston 36 or the chock of the roll 16. Any such movement is representative of a change in the roll gap by reason of the relationship that the piston cylinder assembly has to the roll 16. The position transducer may take several well-known forms such as what is commonly known as an LVDT (linear variable differential transducer) sold by Schaevitz Engineering or what is known by the trademark "INDUCTOSYN" sold by the Farrand Controls, Inc.

The position transducer produces a signal of the actual roll gap which is sent to an amplifier 40. The amplifier also receives a set signal representing the desired roll opening or gap from a potentiometer 42. Accordingly, the amplifier, to the extent there exists a difference between the actual and the desired roll gap, will produce a corrective or error signal $\Delta G$, which is sent to a servo-valve 44 that controls the flow of fluid to the piston cylinder assembly 28. The servo-valve receives its fluid from a conventional accumulator and pump system 46.

In now referring to the aspect of the control that controls the speed of the feed screw 30, the piston cylinder assembly 28 is provided with a pressure transducer 48, only diagrammatically shown, which may follow several well-known types, the signal from which represents the actual pressure in the piston cylinder assembly 28. The actual pressure signal is sent to an amplifier 50 which also receives a set signal from a potentiometer 52 representing the desired piston cylinder assembly pressure. The amplifier 50, to the extent a difference exists between the actual and desired piston cylinder assembly pressures produces a corrective or error signal Δ P which is sent to the motor 32 associated with the feed screw 30.

In the practice of the present invention the position transducer 38 will effect a change in the flow of fluid to the piston cylinder assembly 28 until a difference between the actual roll gap and desired roll gap signals is reduced to zero thereby assuring that the material produced by the rolling action will have a constant thickness. It will be appreciated that the detected difference between the actual and the desired values of the roll gap will be very quickly corrected for by the very first action of the piston cylinder assembly 28.

In like manner any difference existing between the actual piston cylinder assembly pressure and the desired piston cylinder assembly pressure will be corrected for by varying the speed of the motor 32 and hence, the screw 30 until the difference is reduced to zero. In this way there is assured that a constant density product will be produced by the briquetting machine.

In accordance with the provisions of the patent statutes, I have explained the principle and operation of my invention and have illustrated and described what I consider to represent the best embodiment thereof.

I claim:

1. A control for a briquetting machine or the like, said machine having a pair of relatively movable cooperating rolls forming a roll gap between which material to be compressed is fed and a screw for feeding material to said roll gap, separate power means for causing said relative movement between said rolls and for varying the rate of feed of said screw, a transducer associated with said power means for said rolls for measuring the relative movement therebetween and for producing a signal representative of said measurement, a second transducer associated with said power means for said rolls for measuring a change in the power developed by said power means for said rolls and producing a signal representative of said measurement, and a control means for receiving said signals and for comparing said signals with values representing desired values for said measured values and for controlling the operation of said power means to vary the relative positions of said rolls and the rate of feed of said screw to produce a substantial constant thickness and constant density product.

2. A control for a briquetting machine or the like, said machine having a pair of relatively movable cooperating rolls forming a roll gap between which material to be compressed is fed and a screw for feeding material to said roll gap, a piston cylinder assembly for causing said relative movement between said rolls, a motor for varying the rate of feed of said screw, a position transducer associated with said piston cylinder assembly and arranged to produce a signal representative of the amount of relative movement between said rolls, a pressure transducer associated with said piston cylinder assembly for measuring any change in pressure thereof and for producing a signal representative thereof, and a control for receiving said signals including means for comparing said signals with values representing a desired position of said rolls and a desired pressure in said piston cylinder assembly, and further including means for producing separate error signals from said comparisons and means for causing said piston cylinder assembly and said motor to operate to change said relative position of said rolls and said rate of feed of said screw, respectively, to reduce said error signals to zero thereby to produce a product having a substantial constant thickness and constant density.

3. A control for a briquetting machine according to claim 2 wherein said control includes a first subcontrol including an amplifier for receiving said position transducer signal and a signal of the desired roll position, said amplifier producing a first corrective signal from said two signals fed to it, a servo-valve associated with said piston cylinder assembly for receiving said first corrective signal for changing the rate of flow to said piston cylinder assembly in order to reduce said first corrective signal to zero, said control further including a second subcontrol, including a second amplifier for receiving said signal from said pressure transducer and a signal representative of the desired pressure in said piston cylinder assembly, said second amplifier producing a second corrective signal from said two signals fed to it, and said motor adapted to receive said second corrective signal and to effect a change in the rate of feed of said screw in order to reduce said second corrective signal to zero.

* * * * *